(12) United States Patent
Mani et al.

(10) Patent No.: US 7,778,275 B2
(45) Date of Patent: Aug. 17, 2010

(54) METHOD FOR DYNAMICALLY ALLOCATING NETWORK ADAPTERS TO COMMUNICATION CHANNELS FOR A MULTI-PARTITION COMPUTER SYSTEM

(75) Inventors: Anbazhagan Mani, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 11/537,309

(22) Filed: Sep. 29, 2006

(65) Prior Publication Data

US 2008/0080544 A1    Apr. 3, 2008

(51) Int. Cl.
*H04J 3/16* (2006.01)
*G06F 15/173* (2006.01)

(52) U.S. Cl. .................. 370/468; 370/229; 709/223; 709/226; 709/238

(58) Field of Classification Search .................. None
See application file for complete search history.

(56) References Cited

U.S. PATENT DOCUMENTS

| 5,491,695 | A * | 2/1996 | Meagher et al. | 370/260 |
|---|---|---|---|---|
| 6,754,714 | B1 * | 6/2004 | Chebrolu | 709/229 |
| 7,245,635 | B2 * | 7/2007 | Mo et al. | 370/468 |
| 7,325,062 | B2 * | 1/2008 | Hamilton et al. | 709/226 |
| 2002/0105949 | A1 * | 8/2002 | Shinomiya | 370/386 |
| 2003/0063594 | A1 * | 4/2003 | Li et al. | 370/342 |
| 2004/0202182 | A1 * | 10/2004 | Lund et al. | 370/395.21 |
| 2004/0240381 | A1 * | 12/2004 | Clark et al. | 370/229 |
| 2008/0155553 | A1 * | 6/2008 | Astigarraga et al. | 718/108 |

OTHER PUBLICATIONS

"Cisco Systems and HP Fast Etherchannel and Auto-Port Aggregation Software" pp. 1-5, retrieved Jun. 22, 2006, http://www.hp.com/products1/servconnectivity/infolib/cisco.html.
"System Management Guide: Communications and Networks. EtherChannel and IEEE 802.3ad Link Aggregation" pp. 1-20, retrieved Jun. 22, 2006, http://publib16.boulder.ibm.com/pseries/en_US/aixbman/commadmn/tcp_etherchannel.html.

* cited by examiner

*Primary Examiner*—Steven H Nguyen
(74) *Attorney, Agent, or Firm*—Yee & Associates, P.C.; Matthew W. Baca

(57) ABSTRACT

In an arrangement comprising a partitioned computer system and a switch with multiple adapters, wherein adapters are combined to form channels on respective partitions, a method is provided for dynamically changing the configuration of channels to which some of the adapters are assigned. The method allows better utilization for over-all network bandwidth. In one embodiment, the method includes initially allocating the adapters to establish at least one communication channel between each partition and the switch, wherein one or more adapters are allocated to each channel. Metric data is acquired for each channel during a time period, wherein the metric data indicates bandwidth utilization of respective channels. The metric data is evaluated to detect a first channel that under-utilizes available bandwidth when a second channel is over-utilizing available bandwidth. Adapters are reallocated from the first channel to the second channel by leveraging advanced Operating System and firmware support for dynamic adapter configuration, following detection of such event.

20 Claims, 3 Drawing Sheets

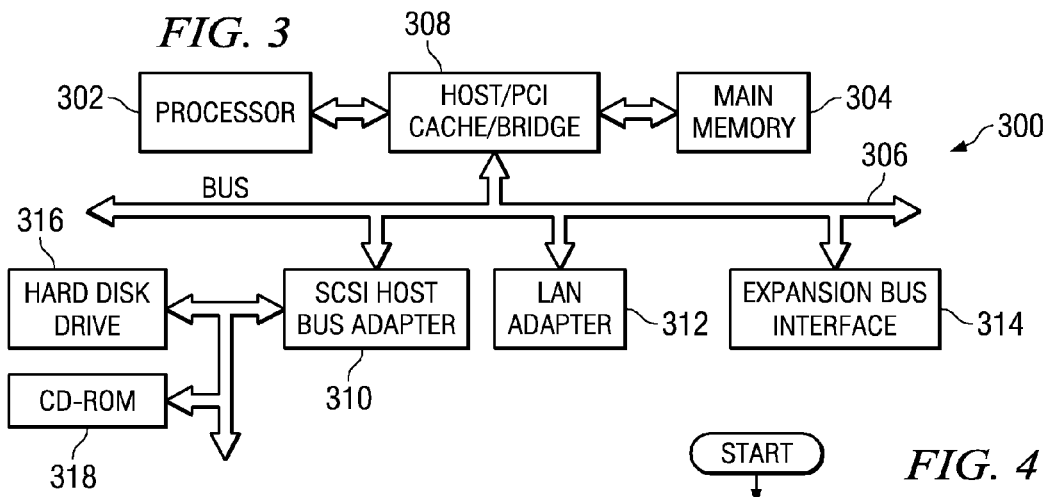
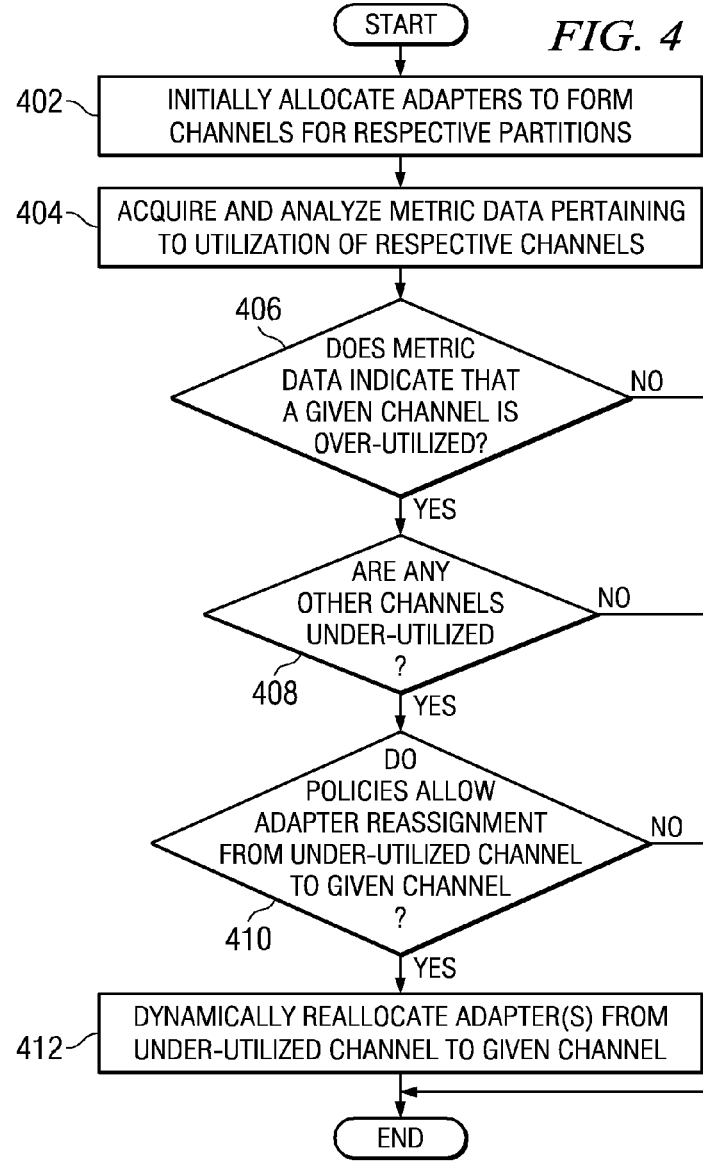

METHOD FOR DYNAMICALLY ALLOCATING NETWORK ADAPTERS TO COMMUNICATION CHANNELS FOR A MULTI-PARTITION COMPUTER SYSTEM

BACKGROUND OF THE INVENTION

1. Field of the Invention

The invention disclosed and claimed herein generally pertains to a method for a computer system that comprises multiple partitions, wherein a switch having multiple adapters is also provided to connect the computer system to the Ethernet or other external network. More particularly, the invention pertains to a method for the above configuration, wherein the method dynamically allocates the adapters to channels for carrying traffic between system partitions and the switch. Even more particularly, the invention pertains to a method of the above type wherein the adapters are selectively assigned to and released from respective channels, in order to improve utilization of available network bandwidth.

2. Description of the Related Art

There is currently a strong demand for high-end computer systems that can provide great flexibility. Systems of this type include for example the Central Electronic Complex (CEC), a product of International Business Machines Corporation (IBM), which is partitioned to include multiple multichip-based processing units. In such systems, administrators seek increasing ability to manage precious system resources such as network bandwidth.

In partitioned systems of the above type, it is common to provide access to an external network by means of a switch having multiple network adapters. Each adapter is associated with a corresponding port included in the switch, and the adapters are used in establishing channels between the switch and respective system partitions. If the network is an Ethernet network, the adapters are referred to as Ethernet adapters, and established channels comprise EtherChannels.

Moreover, in using a computer system of the above type, it is common to configure a Hardware Management Console (HMC) to manage the system. The HMC can also be used by a system administrator to form channels for the partitions from the adapters. In other cases, other control hosts like Integrated Virtualization Manager (IVM) can be used to set up EtherChannels. In some other cases (for example IBM AIX and Virtual I/O Server, administrator can use Operating System facilities to create EtherChannels. More particularly, taking advantage of currently available network port aggregation technologies, such as EtherChannel or IEEE 802.3ad Link Aggregation, several Ethernet adapters can be aggregated together to form a single pseudo Ethernet device. For example, two actual or physical Ethernet adapters, identified as ent0 and ent1, can be aggregated into a single logical device, identified as adapter or EtherChannel ent3. The logical adapter ent3 would then be configured with an IP address, and the aggregated adapters would be considered by the system to be just one adapter. In addition, all adapters aggregated into a logical adapter, such as ent0 and ent1, are similarly treated by remote systems as if they were just one adapter. Both EtherChannel and IEEE 802.3ad Link Aggregation require support in the switch, so that the switch will be aware of which switch ports should be treated as a single port.

Adapter aggregation, as described above, is beneficial in that the network bandwidths of all adapters included in an aggregation are contained in a single network presence. Thus, if one adapter fails, network traffic is automatically sent on to the next available adapter without disruption to existing user connections. The failed adapter will later be automatically returned to service on the EtherChannel or Link Aggregation, after it recovers. Several Unix and Linux Operating Systems support EtherChannel or Link Aggregation. For example, IBM AIX and Virtual I/O Server Operating Systems running on IBM Power hardware supports creation of EtherChannels.

Notwithstanding the benefits noted above, when currently available practices are used to form EtherChannels by aggregating several adapters, the configurations that result therefore tend to be quite static. Static channel configurations, in turn, can prevent system users from optimally using the available network bandwidth. For example, a scenario can arise, due to unprecedented workload conditions or the like, wherein some partitions are not fully utilizing their available EtherChannel bandwidth. At the same time, other partitions are found to be exceeding their available total bandwidth, and are thus in need of additional bandwidth. Such situations are common in e-business, as exemplified by a system partition running a bookstore web application. Such system partition could undergo a sudden, very substantial increase in network traffic, upon the release of a popular book.

While an EtherChannel can load-balance network traffic between its own assigned Ethernet adapters, there is currently no automated mechanism available to dynamically release Ethernet adapters from one EtherChannel, and then assign them to a different EtherChannel. Moreover, there is no mechanism for taking such action based on a system-level assessment of network bandwidth utilization, or on related Rules and Policies.

SUMMARY OF THE INVENTION

The invention generally provides an arrangement wherein an HMC or the like is configured to manage a computer system that has multiple partitions for processing, such as a CEC. The HMC also configures channels for respective partitions from the adapters of an associated switch. The HMC acquires and analyzes information regarding the workloads of the partitions, and also regarding network bandwidth utilizations of the channels. From its analysis, the HMC may determine that one partition is using substantially less than its available bandwidth, whereas another partition has reached its maximum bandwidth and is getting more requests to be served. Accordingly, the HMC can release one or more adapters from the channel of the under-utilized partition, and assign them to the over-utilized channel on another partition. In an embodiment of the invention, a method is provided that includes the step of initially allocating the adapters to establish at least one communication channel between each partition and the switch, wherein one or more adapters are allocated to each of the channels. Metric data is acquired for each of the channels during a specified time period, wherein the metric data is selected to indicate bandwidth utilization of respective channels during the time period. The metric data is evaluated to detect an event that comprises a first channel under-utilizing available bandwidth, when a second channel is over-utilizing its available bandwidth, and the first channel has a plurality of adapters allocated thereto. One or more adapters are reallocated from the first channel to the second channel by leveraging advanced Operating System and firmware support for dynamic adapter membership configuration, following detection of the event.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram showing a computer or data processing system that may be used as an HMC for the embodiment of FIG. 1; and FIG. 4 is a flowchart depicting respective steps of an embodiment of the invention.

DETAILED DESCRIPTION OF THE PREFERRED EMBODIMENT

Figure 1:
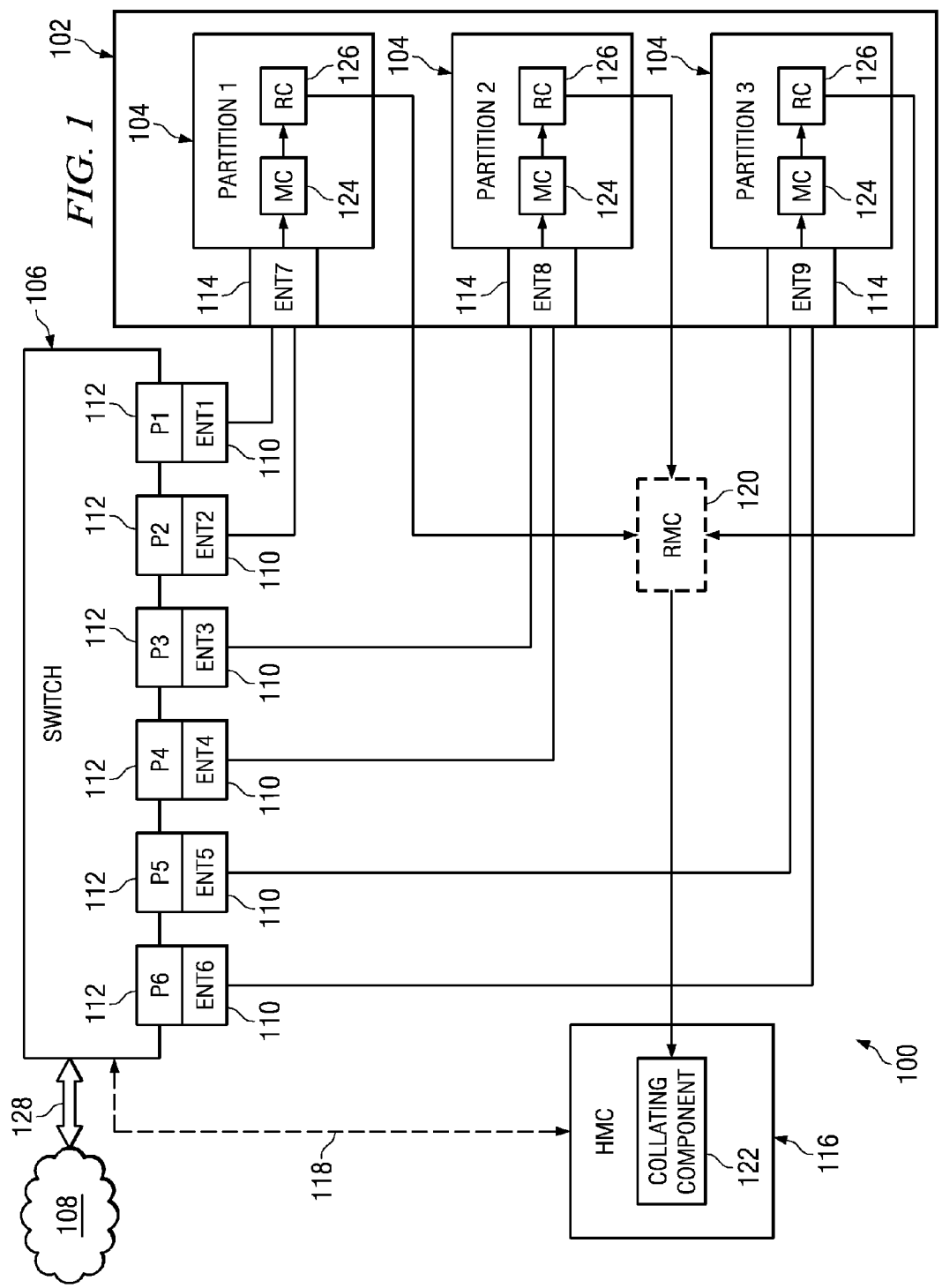
FIG. 1 is a block diagram showing components for implementing an embodiment of the invention.

Referring to FIG. 1, there is shown a computer system 102 of a type that includes multiple processor units and is divided into multiple workload partitions. Usefully, computer system 102 comprises a CEC product of IBM, as described above. However, in other embodiments of the invention other types of partitioned computer systems may alternatively be used. FIG. 1 shows system 102 provided with three partitions 104, individually referred to as Partition 1-Partition 3, for illustrative purposes.

FIG. 1 shows system 102 to be part of a configuration 100, which further includes an Ethernet switch 106 for connecting respective partitions 104 of the system 102 to Ethernet 108, via a link 128. Switch 106 thus provides connectivity for computer system 102 to external networks and systems. Switch 106 is provided with ports 112, respectively identified as P1-P6, and is further provided with Ethernet network adapters 110, each usefully comprising a network interface card (NIC). Adapters 110 are identified as ent1-ent6, and mate with ports P1-P6, respectively.

As described above, a plurality of Ethernet adapters can be combined or aggregated to form a single logical adapter, also referred to as an EtherChannel. Thus, FIG. 1 shows adapters ent1 and ent2 initially aggregated together to establish an EtherChannel 114 identified as ENT7. The EtherChannel ENT7 is seen to extend between switch 106 and Partition 1, and is configured to carry data and other traffic there between. Similarly, FIG. 1 shows adapters ent3 and ent4 initially aggregated to form an EtherChannel 114 identified as ENT8, and further shows adapters ent5 and ent6 aggregated to form EthernetChannel ENT9. EtherChannels ENT8 and ENT9 connect Partitions 2 and 3, respectively, to switch 106. It is to be understood that while FIG. 1 shows only one EtherChannel 114 connected to each partition, there can in fact be multiple EtherChannels connected between a partition and switch 106, to send traffic there between.

The adapters that belong to an EtherChannel 114 must be connected to the same EtherChannel-enabled switch 104, as is shown by FIG. 1. This switch must be manually configured to treat the port that belongs to an EtherChannel as an aggregated link. Traffic is distributed across the adapters 110 either in a standard way, wherein the adapter over which the packets are sent is chosen by an algorithm, or on a round-robin basis. In the round-robin approach, packets are sent evenly across all adapters.

Multiple Ethernet adapters 110 are configured to form an EtherChannel 114 by the operation of an HMC 116, which is connected to switch 106 and interfaces therewith by means of a link 118. HMC 116, which may comprise a PC or other data processing system, is generally provided to manage the computer system 102. In addition, HMC 116 respectively allocates adapters ent1-ent6 to set up EtherChannels ENT7-ENT9 as described above. Subsequently, HMC 116 may be operated, as described hereinafter in further detail, to reallocate or reassign adapters from one channel to another.

Referring further to FIG. 1, there is shown a Remote Monitoring and Control Interface 120 positioned between HMC 116 and respective partitions 104 of computer system 102. HMC 116 uses the RMC 120 to communicate with the partitions 104, and to control their respective operations. The collating component 122 is a software component located at the HMC and implemented using RMC 120 interface. RMC services or daemons should run on the operating systems in each one of the partitions. Each component 124 comprises a monitoring component (MC), and each component 126 comprises a reporting component (RC), for carrying out functions as described hereinafter. Both MC and RC will utilize RMC for communicating with Collating Component 122 on the HMC.

As previously discussed, the aggregation of multiple Ethernet adapters into a single logical entity provides an EtherChannel that has the cumulative bandwidth of all of its constituent adapters. Even so, however, the operation of a partition 104 may become so active that the data traffic to and from the partition exceeds the total bandwidth capacity of the partition EtherChannel. Thus, the EtherChannel is clearly being over-utilized. In accordance with embodiments of the invention, it would be advantageous to recognize this situation, and to then alleviate the situation by reallocating adapters from under-utilized Etherchannels to the EtherChannel that is being over-utilized.

In view of these objectives, each of the components 124 of RMC 120 is connected to a corresponding EtherChannel 114, to monitor bandwidth utilization therein. More particularly, a monitor component 124 acquires pre-specified types of metric data that will collectively indicate network bandwidth utilization. One type of metric that could be monitored for this purpose would be throughput, that is, the amount of data sent through the channel per second (or per other unit of time). Another type of metric would be response latency, which is the time required for a packet to travel from the source sending it to the destination at which it is received. Yet another metric would be round trip latency, that is, the source to destination time plus the destination to source time. Other types of metric data may be monitored as well or alternatively, in other embodiments of the invention.

After the metric data for a channel has been acquired by a monitoring component 124, the reporting component 126 connected thereto sends the metric data to collating component 122 of RMC 120, located in HMC 116. The collating component places the metric data showing bandwidth utilization for all of the partitions into a usable format or ordered arrangement or saves it in a database. Periodically, HMC 116 will query the data provided by collating component 122, to get information regarding the network bandwidth utilization of individual EtherChannels 114. As an example, it is assumed that Partition 1 is found during this procedure to be utilizing only 30 per cent of its total available bandwidth. At the same time, however, Partition 3 has reached its maximum bandwidth, and is receiving more requests from clients wanting service. In view of this, HMC 116 will analyze the workloads of all the partitions in the system 102, and will further analyze network bandwidth utilization of the EtherChannels associated with respective individual partitions 114. Since Partition 1 is under-utilizing its bandwidth, HMC 116 will act to release Ethernet adapter ent2 from the ENT7 EtherChannel. By releasing only ent2 from ENT7, the MAC address of ENT7 will continue to the MAC address of adapter ent1.

After adapter ent2 is released from EtherChannel ENT7, HMC 116 will invoke a dynamic reallocation (DR) operation on Partition 3, in order to dynamically add Ethernet adapter ent2 to the EtherChannel ENT9. Thereupon, EtherChannel ENT9 will aggregate three Ethernet adapters, that is, ent5, ent6 and ent2. Thus, Partition 3 will receive additional bandwidth to better process the service requests coming from its clients. In this new configuration the MAC address of EthernetChannel ENT9 will continue to be the MAC address of adapter ent5.

Removal or addition of one (or more) adapters from one EtherChannel is accomplished by using Operating System support. For example, IBM AIX has implemented Dynamic Adapter Membership which allows Ethernet adapters 110 to be selectively removed from and added to EtherChannels in a transparent way, without causing any disruptions to the user connections.

Once the adapter is removed from the EtherChannel, it has to be assigned to a different partition before it can be added to the EtherChannel.

Moving one physical adapter from one partition from another partition on the same CEC can be achieved by using Dynamic Logical Partition (DLPAR) operation and Dynamic Re-Configuration (DR). Prior to the enablement of DLPAR, reboot of the partition is required to add additional resources to a system. DLPAR increases the flexibility of logically partitioned systems by allowing a user to dynamically add and remove processors, memory, I/O slots, and I/O drawers from active logical partitions. A user can reassign hardware resources and adjust to changing system capacity demands without impacting the availability of the partition. DLPAR operations can be performed from the HMC and no reboot is required on the partitions. Once the adapter is assigned to another partition, the Operating System will dynamically re-configure it and make it available to be added to the EtherChannels it owns.

Figure 2:
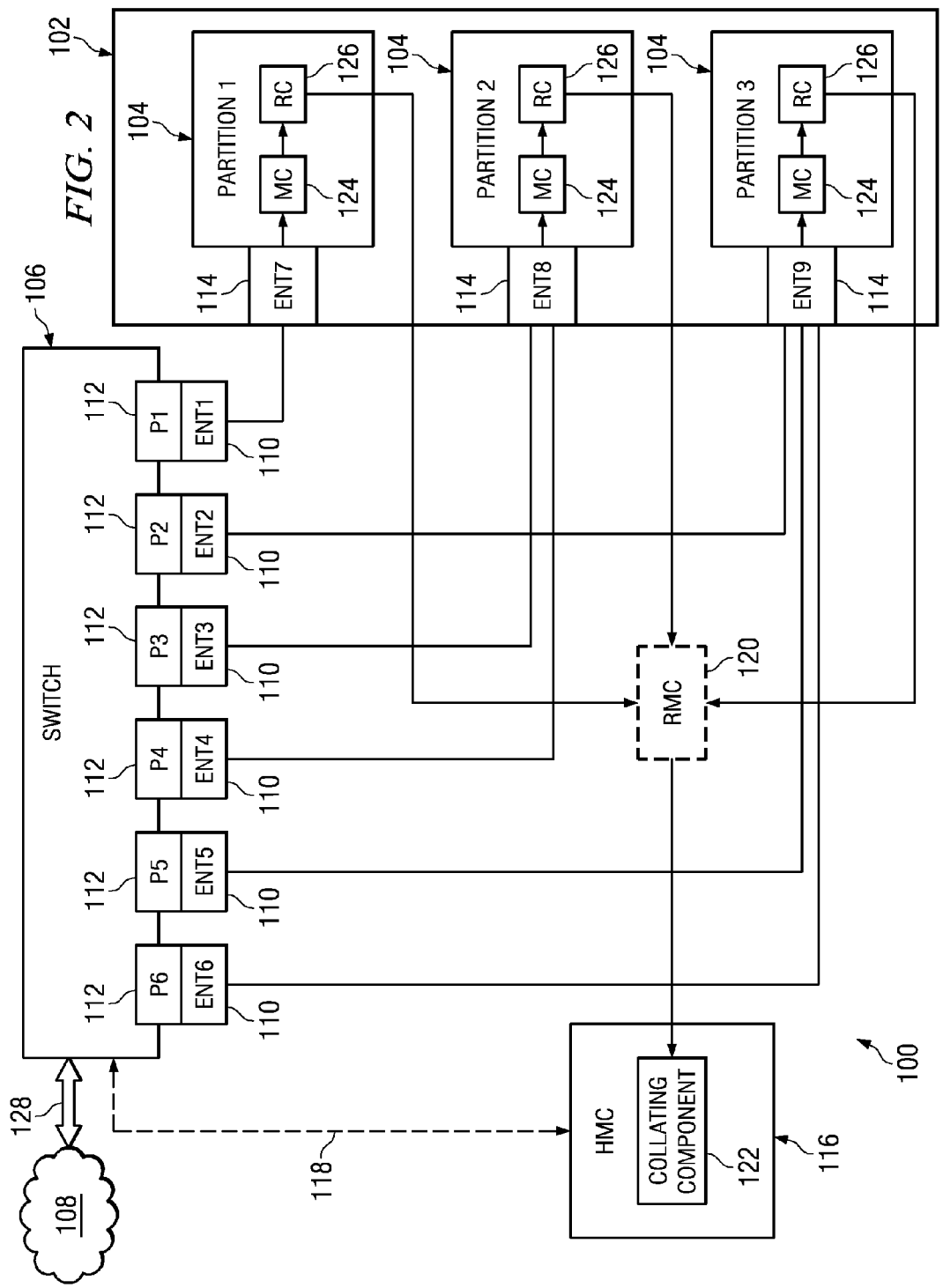
FIG. 2 is a block diagram showing FIG. 1 with a modification to further illustrate the embodiment thereof.

Referring to FIG. 2, there is shown the new configurations of EtherChannels ENT7 and ENT9. Adapter ent2 is seen to be aggregated in EtherChannel ENT9 with adapters ent5 and ent6, whereas EtherChannel ENT7 only includes adapter ent1. Subsequently, HMC 116 will continue to monitor the network utilization. When the bandwidth utilization of EtherChannel ENT9 drops below a certain threshold, HMC 116 will invoke a DR operation to dynamically release adapter ent2 from EthernetChannel ENT9, and add it back to the EtherChannel ENT7 to which it belongs. Thus, by continuous monitoring, measurement and analysis of network bandwidth utilization, HMC 116 is able to achieve optimal network bandwidth utilization, by dynamically assigning and releasing adapters 110 based on demand. This allows better utilization of over-all network bandwidth, and will be of particular benefit in bandwidth intensive applications, such as multimedia, gaming and certain websites. It will be understood that other embodiments of the invention may contain many more Ethernet adapters per channel than those shown herein. Also, one partition may contain more than one EtherChannel.

HMC 116 can be provided with an advanced configuration panel called "Collaboration Mode" for Ethernet adapters 110. This mode, when set, will enable HMC 116 to continuously monitor and dynamically assign or reassign Ethernet adapters 110 to EtherChannels 114 across partitions on demand (on a single CEC system 102). Moreover, HMC 116 can be furnished with policies and rules, for use in guiding its selection of Ethernet adapters for assignment and reassignment to EtherChannels. A number of policy types are possible, the following being representative examples:

a. For some EtherChannel configurations, it is possible to specify a policy in such a way that its associated Ethernet adapters will never be removed during its lifetime.
b. For some partitions, a policy can be specified that all EtherChannels are static and cannot be modified during its runtime.
c. For some partitions, a policy can be specified that its Ethernet adapters on a particular EtherChannel can be released only if its bandwidth utilization is less than 25%.
d. For some partitions, a policy can be specified that Ethernet adapters can be released when bandwidth utilization drops below 30% but should be reassigned when the bandwidth utilization reaches 60%.
e. We can implement a lease scheme for virtually loaning Ethernet adapters to other EtherChannels. The lease has to be renewed every x minutes, after which the Ethernet adapter will be removed and reassigned to the original EtherChannel to which it belongs.

Referring to FIG. 3, there is shown a block diagram of a generalized computer or data processing system 300 which may be adapted for use as the Hardware Management Console 116 in the configuration 100 shown in FIGS. 1 and 2. Data processing system 300 exemplifies a computer, in which code or instructions for implementing the processes of the present invention may be located. Data processing system 300 usefully employs a peripheral component interconnect (PCI) local bus architecture, although other bus architectures such as Accelerated Graphics Port (AGP) and Industry Standard Architecture (ISA) may alternatively be used. FIG. 3 shows a processor 302 and main memory 304 connected to a PCI local bus 306 through a Host/PCI bridge 308. PCI bridge 308 also may include an integrated memory controller and cache memory for processor 302.

Referring further to FIG. 3, there is shown a local area network (LAN) adapter 312, a small computer system interface (SCSI) host bus adapter 310, and an expansion bus interface 314 respectively connected to PCI local bus 306 by direct component connection. SCSI host bus adapter 310 provides a connection for hard disk drive 316, and also for CD-ROM drive 318.

An operating system runs on processor 302 and is used to coordinate and provide control of various components within data processing system 300 shown in FIG. 3. The operating system may be a commercially available operating system such as Windows XP, which is available from Microsoft Corporation. Instructions for the operating system and for applications or programs are located on storage devices, such as hard disk drive 316, and may be loaded into main memory 304 for execution by processor 302.

Referring to FIG. 4, there are shown steps for a procedure summarizing an embodiment of the invention. Initially, the HMC allocates adapters to configure channels for respective partitions, as described above and shown by step 402. At step 404, metric data pertaining to bandwidth utilization is acquired, such as by means of components 124 and 126 described above, and the data is periodically analyzed by the HMC. As shown by step 406, if the metric data indicates that no channel is over-utilized, the procedure of FIG. 4 is ended. However, if a given channel is over-utilized, it is necessary to determine whether there are any under-utilized channels, in accordance with step 408. If there are no such under-utilized channels, the procedure is ended.

As shown by step 410, if there is one or more under-utilized channels, it must be determined whether policies in effect would allow reassignment of adapters, from any of the under-utilized channels to the given channel. If not, the procedure is again ended. Otherwise, one or more adapters are allocated from an under-utilized channel to the given channel, in accordance with step 412.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a configuration provided with a computer system having multiple processor partitions, and further provided with a switch having multiple adapters, a method comprising the steps of:
   initially allocating said adapters to establish at least one communication channel between each partition and said switch, wherein one or more adapters are allocated to each of said channels;
   acquiring metric data for each of said channels during a specified time period, wherein said metric data is selected to indicate bandwidth utilization of respective channels during said time period;
   evaluating said acquired metric data to detect an event that comprises a first channel under-utilizing its available bandwidth, when a second channel is over-utilizing its available bandwidth and said first channel has a plurality of adapters allocated thereto; and
   reassigning one or more adapters from said first channel to said second channel, following detection of said event.

2. The method of claim 1, wherein:
a plurality of adapters allocated to a channel are aggregated to form a single logical adapter that comprises the channel.

3. The method of claim 1, wherein:
each of said adapters comprises an Ethernet adapter, and each of said channels comprises an EtherChannel.

4. The method of claim 1, wherein:
said acquisition of metric data includes at least acquiring data that pertains to metric data types respectively identified as throughput and response latency.

5. The method of claim 1, wherein:
said evaluating and reassigning steps are carried out by means of a control host, wherein said control host is a Hardware Management Console or an Integrated Virtualization Manager.

6. The method of claim 5, wherein:
said Hardware Management Console is furnished with pre-specified policies for use in selecting an adapter for reassignment from one channel to another channel.

7. The method of claim 1, wherein:
each of said partitions is provided with a data monitoring component and a reporting component, the monitoring and reporting components of a given partition being used to monitor and report metric data that pertains to network utilization of a channel used by the given partition.

8. The method of claim 7, wherein:
said monitoring and reporting components for each partition are respectively included in a Remote Monitoring and Control interface that extends between said computer system and a Hardware Management Console for carrying out said evaluating and reassigning steps, and provides communication there between.

9. The method of claim 1, wherein:
said reassigned adapters are reassigned back to said first channel from said second channel, when utilization of said second channel drops below a specified threshold.

10. The method of claim 1, wherein:
a Dynamic Adapter Membership is used to allow transparent reassignments of said adapters from one channel to another.

11. The method of claim 1, wherein:
a Dynamic Logical Partition Operation (DLPAR) and Dynamic Re-Configuration(DR) is used to allow transparent reassignment of adapters from one partition to another.

12. In a configuration provided with a computer system having multiple processor partitions, and further provided with a switch having multiple adapters, a computer program product in a non-transitory computer readable medium comprising:
   first instructions for initially allocating said adapters to establish at least one communication channel between each partition and said switch, wherein one or more adapters are allocated to each of said channels;
   second instructions for acquiring metric data for each of said channels during a specified time period, wherein said metric data is selected to indicate bandwidth utilization of respective channels during said time period;

third instructions for evaluating said acquired metric data to detect an event that comprises a first channel under-utilizing its available bandwidth, when a second channel is over-utilizing its available bandwidth and said first channel has a plurality of adapters allocated thereto; and fourth instructions for reassigning one or more adapters from said first channel to said second channel, following detection of said event.

13. The computer program product of claim 12, wherein:
said acquisition of metric data includes at least acquiring data that pertains to metric data types respectively identified as throughput and response latency.

14. The computer program product of claim 12, wherein:
said evaluating and reassigning steps are carried out by means of a Hardware Management Console that is included in said configuration, and that is furnished with pre-specified policies for use in selecting an adapter for reassignment from one channel to another channel.

15. The computer program product of claim 12, wherein:
said reassigned adapters are reassigned back to said first channel from said second channel, when utilization of said second channel drops below a specified threshold.

16. In a configuration provided with a computer system having multiple processor partitions, and further provided with a switch having multiple ports, apparatus comprising:

adapters respectively corresponding to said switch ports, and disposed for initial allocation to establish at least one communication channel between each partition and said switch, wherein one or more adapters are allocated to each of said channels;

components connected to acquire metric data for each of said channels during a specified time period, wherein said metric data is selected to indicate bandwidth utilization of respective channels during said time period; and a Hardware Management Console (HMC) for evaluating said acquired metric data to detect an event that comprises a first channel under-utilizing its available bandwidth, when a second channel is over-utilizing its available bandwidth and said first channel has a plurality of adapters allocated thereto, said HMC further operative to reassign one or more adapters from said first channel to said second channel, following detection of said event.

17. The apparatus of claim 16, wherein:
each of said adapters comprises an Ethernet adapter, and each of said channels comprises an EtherChannel.

18. The apparatus of claim 16, wherein:
said Hardware Management Console is furnished with pre-specified policies for use in selecting an adapter for reassignment from one channel to another channel.

19. The apparatus of claim 16, wherein:
said acquiring components comprise a monitoring component and a reporting component for each partition, the monitoring and reporting components of a given partition being used to monitor and report metric data that pertains to network utilization of a channel used by the given partition.

20. The apparatus of claim 19, wherein:
said monitoring and reporting components for each partition are respectively included in a Remote Monitoring and Control interface that extends between said computer system and said HMC, and provides communication there between.

* * * * *